US008789428B2

(12) United States Patent
Schuker

(10) Patent No.: US 8,789,428 B2
(45) Date of Patent: Jul. 29, 2014

(54) MEASURING TRANSDUCER AS WELL AS MEASURING SYSTEM FORMED THEREWITH

(71) Applicant: Endress + Hauser Flowtec AG, Reinach (CH)

(72) Inventor: Michael Schuker, Rummingen (DE)

(73) Assignee: Endress + Hauser Flowtec AG, Reinach (CH)

(*) Notice: Subject to any disclaimer, the term of this patent is extended or adjusted under 35 U.S.C. 154(b) by 51 days.

(21) Appl. No.: 13/664,664

(22) Filed: Oct. 31, 2012

(65) Prior Publication Data

US 2013/0125665 A1    May 23, 2013

(30) Foreign Application Priority Data

Oct. 28, 2011  (DE) .......................... 10 2011 085 408

(51) Int. Cl.
*G01F 1/84* (2006.01)

(52) U.S. Cl.
USPC .................................................... 73/861.355

(58) Field of Classification Search
USPC ...................... 73/861.355, 861.356, 861.357
See application file for complete search history.

(56) References Cited

U.S. PATENT DOCUMENTS

| 4,676,276 A * | 6/1987 | Fawley .......................... 138/172 |
| 5,731,527 A * | 3/1998 | Van Cleve ................ 73/861.355 |
| 2006/0110560 A1 | 5/2006 | Hussain |
| 2009/0173167 A1 | 7/2009 | Takayanagi |

FOREIGN PATENT DOCUMENTS

| DE | 19601342 A1 | 7/1996 |
| DE | 102004057088 B3 | 6/2006 |
| DE | 102008014712 A1 | 9/2009 |

OTHER PUBLICATIONS

Search Report in PCT/EP2012/070924, dated Mar. 27, 2013.
German Search Report, Aug. 31, 2012.

* cited by examiner

*Primary Examiner* — Jewel V Thompson
(74) *Attorney, Agent, or Firm* — Bacon & Thomas, PLLC

(57) ABSTRACT

A measuring transducer comprises at least one measuring tube for carrying a flowing medium as well as a transducer housing mechanically coupled with the at least one measuring tube. The transducer housing includes: an inner shell forming a cavity accommodating the at least one measuring tube; and an outer cladding formed at least partially by means of yarn, namely cladding placed outside of the cavity and surrounding the inner shell.

16 Claims, 4 Drawing Sheets

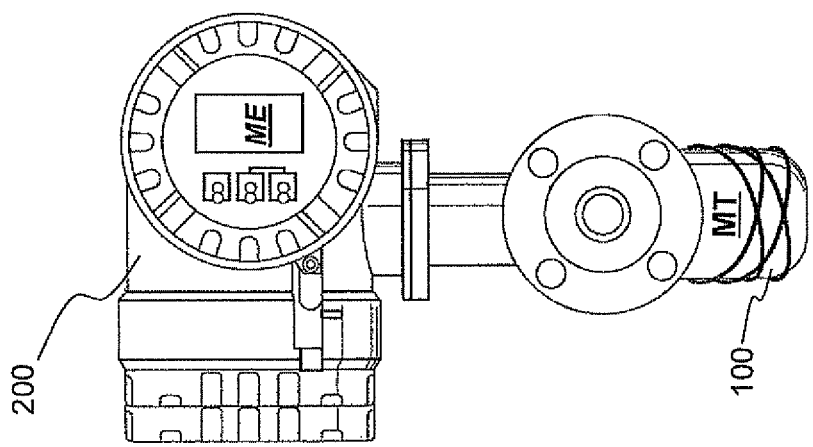
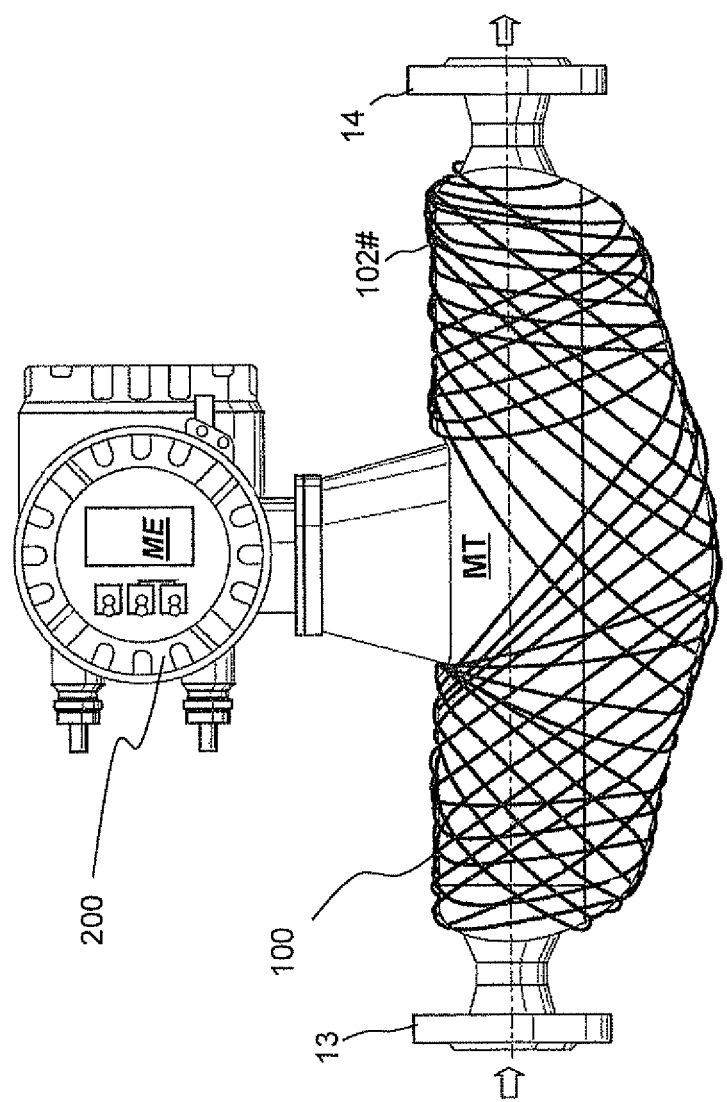
Fig. 1b
Fig. 1a

MEASURING TRANSDUCER AS WELL AS MEASURING SYSTEM FORMED THEREWITH

TECHNICAL FIELD

The invention relates to a measuring transducer having: a measuring tube for carrying a flowing medium; and a transducer housing mechanically coupled with the at least one measuring tube and exhibiting improved pressure resistance. Moreover, the invention relates to a measuring system formed by means of such a measuring transducer.

BACKGROUND DISCUSSION

For registering measured variables of flowing media, for example, of gases and/or liquids, and for producing measured values correspondingly representing the measured variable, there are used in industrial process measurements technology, especially also in connection with automating chemical processes or procedures for producing a product from a raw or starting material by the use of chemical, physical or biological processes, process-near measuring systems, which are formed by means of: a measuring transducer in communication with a process line carrying the particular fluid, for example, a process line in the form of a pipeline, thus one flowed-through by the fluid during operation, for example, a measuring transducer in the form of a magnetically inductive measuring transducer or a measuring transducer of the vibration-type; as well as measuring electronics electrically coupled with the measuring transducer, in given cases, also remotely therefrom. The measured variable to be registered can be, for example, a density, a flow velocity, a volume flow, a mass flow, or a viscosity of the medium. Examples of such measuring transducers for flowing media, for instance, magnetically inductive measuring transducers or measuring transducers of the vibration-type, or measuring systems formed therewith, are described in, among others, EP-A 045 646, EP-A 1 001 254, EP-A 770 856, U.S. Pat. No. 5,301,557, U.S. Pat. No. 5,796,011, U.S. Pat. No. 6,044,715, U.S. Pat. No. 6,711,958, U.S. Pat. No. 6,776,052, U.S. Pat. No. 6,957,587, U.S. Pat. No. 7,017,424, U.S. Pat. No. 7,392,709, WO-A 00/57 141, WO-A 00/57141, WO-A 01/65213, WO-A 03/021202, WO-A 03/021203, WO-A 03/076879 or WO-A 98/38479.

Conventional measuring transducers for flowing media, not the least of all magnetically inductive measuring transducers or measuring transducers of the vibration-type, are most often implemented as prefabricated and earlier calibrated, structural units having a measuring tube insertable into the course of the respective process line, serving as part of a physical to electrical transducer, flowed-through during operation of the measuring system by the medium to be measured and equipped with at least one sensor element mounted thereon as well as a transducer housing mechanically coupled with the at least one measuring tube manufactured, for example, of metal. The transducer housing serves as outer protection for the physical to electrical transducer, and is manufactured most often also of metal and forms a cavity accommodating the at least one measuring tube. In the case of a measuring transducer of the vibration-type, the at least one measuring tube is most often held oscillatably at in- and, respectively, outlet-side ends of the transducer housing formed by means of a thick-walled, especially tubular and/or beam-like, support cylinder or a framework, and, for producing mechanical reaction forces in the medium conveyed in the measuring tube, excited, at least at times, to vibrate about a static rest position by means of at least one oscillation exciter, most often an electrodynamic, oscillation exciter, in interactive connection with said measuring tube. For registering, especially inlet-side, respectively outlet-side, vibrations of the measuring tube and for producing at least one measurement signal representing these, such measuring transducers of vibration-type have, furthermore, in each case, at least one oscillation sensor, likewise most often an electrodynamic oscillation sensor, reacting to vibrations, especially bending oscillations, of the measuring tube.

For further processing or evaluation of measuring signals produced by means of the measuring transducer, such includes, furthermore, at least one measuring electronics. The measuring electronics, communicating in suitable manner with the respective sensor element, consequently with the measuring transducer, produces, during operation, from the at least one measurement signal, repeatedly, at least one measured value instantaneously representing the measured variable, for example, thus a mass flow, measured value, volume flow, measured value, density, measured value, and/or viscosity, measured value. For accommodating the measuring electronics, such measuring systems include, most often, a corresponding electronics housing, which can, for example, be arranged remotely from the measuring transducer and connected with this only via a flexible cable. Alternatively thereto, the electronics housing can, as shown, for example, also in the initially mentioned U.S. Pat. No. 5,796,011, be affixed directly on the measuring transducer housing, and so form a compact in-line measuring device. In the case of measuring systems of the described type, the measuring electronics is usually additionally electrically connected via corresponding electrical lines and/or wirelessly via a radio linkage to a superordinated electronic data processing system most often arranged spatially removed from the measuring electronics. Most often, the electronic data processing system is also spatially distributed. Measured values produced by the respective measuring system are forwarded near in time by means of a measured value signal correspondingly carrying the measured values. Measuring systems of the described type are additionally usually connected with one another by means of a line- or radio-based, data transmission network provided within the superordinated data processing system and/or with corresponding electronic process controls, for example, on-site programmable logic controllers (PLCs) or process control computers installed in a remote control room, where the measured values produced by means of the measuring system and digitized and correspondingly coded in suitable manner are forwarded. By means of process control computers, using correspondingly installed software components, the transmitted measured values can be further processed and visualized as corresponding measurement results e.g. on monitors and/or converted into control signals for other field devices embodied as actuating devices, such as e.g. magnetically operated valves, electric-motors, etc. Accordingly, the data processing system serves usually also, to condition the measured value signal delivered by the measuring electronics in accordance with the requirements of downstream data transmission networks, for example, suitably to digitize the measured value signal and, in given cases, to convert such into a corresponding telegram, and/or to evaluate such on-site. For this purpose, there are provided in the data processing systems, electrically coupled with respective connecting lines, evaluating circuits, which pre- and/or further-process as well as, in case required, suitably convert the measured values received from the respective measuring electronics. Serving for data transmission in such industrial data processing systems are at least sectional, especially serial, fieldbusses, such as e.g., FOUNDATION FIELDBUS, CAN, CAN-OPEN, RACKBUS-RS 485, PROFIBUS, etc., or, for example, also networks based on the ETHERNET standard, as well as the corresponding, most often application comprehensively standardized, transmission protocols.

The transducer housing serves, besides for holding the at least one measuring tube placed within the cavity formed by the transducer housing, especially, also for protecting the exciter- and the sensor arrangement, as well as other internally lying components, against outer environmental influences, such as e.g. dust or water spray, consequently to provide a cavity sealed as hermetically as possible. Frequently, moreover, the user also requires that the housing for the measuring transducer, in the case of an unsealed or burst measuring tube, can retain the static internal pressure, which then most often clearly lies above the atmospheric, external pressure, within the cavity, leak-freely, at least for a specified amount of time. Thus, the housing should have a certain level of pressure resistance; compare, in this connection, also the initially mentioned WO-A 00/57 141, U.S. Pat. No. 7,392,709, U.S. Pat. No. 6,957,587, U.S. Pat. No. 6,044,715, U.S. Pat. No. 5,301,557, or EP-A 1 001 254. Particularly for applications with toxic or easily flammable fluids, the transducer housing must, in given cases, even be able to meet the requirements placed on safety containers.

A disadvantage of the state of the art associated therewith is that, not least of all also for applications with media under high static pressure of far above 100 bar, in the case of corresponding scaling of conventional transducer housings, the particular wall thickness and, associated therewith, the mass as well as the manufacturing costs increase disproportionately.

SUMMARY OF THE INVENTION

An object of the invention is, consequently, so to improve transducer housings of measuring transducers of the above-described type, especially those of measuring transducers of the vibration-type serving as Coriolis, mass flow meters and/or as densimeters, that they can, at as little installed measuring transducer mass as possible, also withstand high internal pressures of over 100 bar.

For achieving the object, the invention resides in a measuring transducer, especially a measuring transducer of the vibration-type or a magneto-inductive measuring transducer, comprising: at least one measuring tube, for example, a measuring tube of metal, for carrying a flowing medium, for example, a gas and/or a liquid; as well as a transducer housing mechanically coupled with the at least one measuring tube, wherein the transducer housing has an inner shell, for example, one of metal, namely an inner shell forming a cavity accommodating the at least one measuring tube, and an outer cladding formed at least partially by means of yarn, for example, yarn under mechanical prestress and/or monofilament yarn, namely cladding placed outside of the cavity and surrounding the inner shell.

Moreover, the invention resides in a measuring system for measuring a medium flowing in a pipeline, especially a gaseous and/or liquid medium, which measuring system comprises such a measuring transducer as well as a measuring electronics electrically coupled therewith for producing at least one measured value representing a parameter of the medium, for example, utilizing at least one measurement signal produced by a sensor element of the measuring transducer.

According to a first embodiment of the measuring transducer of the invention, it is provided that the yarn at least partially comprises glass fiber and/or carbon fiber and/or aramid fiber.

According to a second embodiment of the measuring transducer of the invention, it is provided that the yarn is a filament yarn, especially a monofilament yarn, a minifilament yarn or a multifilament yarn.

According to a third embodiment of the measuring transducer of the invention, it is provided that the yarn is wound under prestress and/or multiple times around the inner shell.

According to a fourth embodiment of the measuring transducer of the invention, it is provided that the yarn is elastically strained, consequently is prestressed.

According to a fifth embodiment of the measuring transducer of the invention, it is provided that the inner shell hermetically seals the cavity.

According to a sixth embodiment of the measuring transducer of the invention, it is provided that the inner shell has a cylindrically, especially circularly cylindrically, formed region. Developing this embodiment of the invention further, it is, furthermore, provided that the outer cladding at least partially covers the cylindrically formed region.

According to a seventh embodiment of the measuring transducer of the invention, it is provided that the outer cladding covers more than 50%, especially more than 80%, of the surface of the inner shell.

According to an eighth embodiment of the measuring transducer of the invention, it is provided that the outer cladding contacts more than 50%, especially more than 80%, of the surface of the inner shell.

According to a ninth embodiment of the measuring transducer of the invention, it is provided that the inner shell has, counteracting a static internal pressure reigning within the cavity, a pressure resistance, which is less than 90% of a pressure resistance of the transducer housing counteracting said internal pressure. Developing this embodiment of the invention further, it is, furthermore, provided that the pressure resistance of the transducer housing is greater than 80 bar, especially greater than 100 bar.

According to a tenth embodiment of the measuring transducer of the invention, it is provided that the outer cladding and the inner shell OF the transducer housing contact one another.

According to an eleventh embodiment of the measuring transducer of the invention, it is provided that the outer cladding has a matrix, which embeds the yarn and is formed by means of a synthetic material, especially an epoxide resin.

According to a twelfth embodiment of the measuring transducer the invention, such further comprises: at least one oscillation exciter placed within the cavity formed by the inner shell for producing vibrations of the at least one measuring tube; as well as at least one sensor element placed within the cavity formed by the inner shell for registering vibrations of the at least one measuring tube and for producing a measurement signal representing said vibrations.

A basic idea of the invention is to provide transducer housings of measuring transducers of the vibration-type with a pressure resistance greater than transducer housings of conventional measuring transducers of the vibration-type by winding around an inner shell of the transducer housing serving virtually as a fluid container, consequently a fluid tight, inner shell, a very crack resistant yarn, namely line-shaped textile formed of one or more fibers, in given cases, fibers that are twisted together, for example, one or more carbon fiber(s), aramid fiber(s), and/or glass fiber(s). Thus, the inner shell is reinforced with a comparatively thin and very light, however, extremely crack resistant, outer cladding.

The desired pressure resistance can, in such case, be achieved very easily by a corresponding number of windings and/or a corresponding winding guidance. Further increasing of the pressure resistance to far over 100 bar can be achieved additionally, for example, by introducing a corresponding prestress into the yarn, for instance, by very tight winding of the same, and/or by subsequently affixing the wound yarn with a synthetic material, for example, an epoxide resin, passing through the winding interstices and/or fixedly bonding the shell and the cladding adhesively with one another.

An advantage of the invention resides therein, that, through the application of yarn for forming the outer cladding of the transducer housing, extremely high pressure resistance can be achieved coupled with comparatively little added mass, respectively comparatively little volume growth, this, for example, also as needed, subsequently, for measuring transducers manufactured, and held in inventory, with, first of all, only the inner shell, consequently a transducer housing having only a basic pressure resistance. A further advantage of the invention is, especially, also that it permits, in given cases, slightly modified, transducer housings of conventional measuring transducers directly to be made more pressure resistant.

BRIEF DESCRIPTION OF THE DRAWINGS

The invention as well as other advantageous embodiments thereof will now be explained in greater detail based on examples of embodiments presented in the figures of the drawing. Equal parts are provided in all figures with equal reference characters; when perspicuity requires or it otherwise appears sensible, already mentioned reference characters are omitted in subsequent figures. Other advantageous embodiments or further developments, not least of all also combinations, first of all, of only individually explained aspects of the invention, will become evident, furthermore, from the figures of the drawing, as well as also from the dependent claims per se. The figures of the drawing show as follows:

FIGS. 1a and 1b in two different side views, show a measuring system—here embodied as an in-line measuring device of compact construction—for media flowing in lines, for example pipelines;

DETAILED DISCUSSION IN CONJUNCTION WITH THE DRAWINGS

FIGS. 1a and 1b show, schematically, an example of an embodiment of a measuring system for a medium, such as, for instance, a liquid and/or a gas, flowing in a process line (not shown), especially a measuring system suitable for application in industrial measuring- and automation technology.

The measuring system serves especially for measuring at least one physical, measured variable of the medium guided in the process line (for example, a process line in the form of a pipeline), especially a medium under high static pressure of greater than 80 bar. The measured variable can be, for example, a flow parameter, such as, for instance, a mass flow rate m or a totaled mass flow M, of the flowing medium, or, for example, also a material parameter, such as, for instance, a density $\rho$ or a viscosity $\eta$ of the medium guided in the process line.

Figure 2:
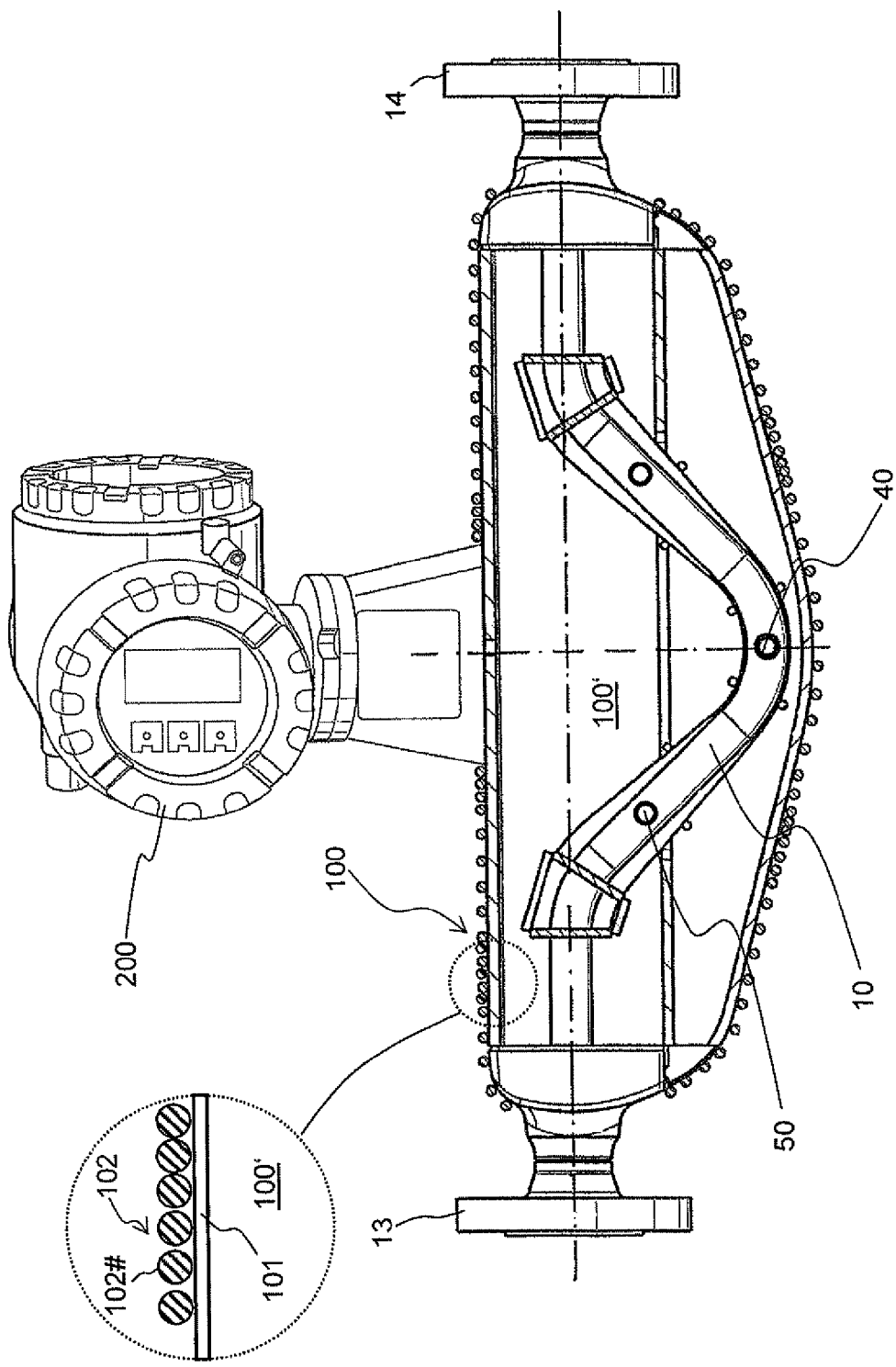
FIG. 2 is a measuring transducer—here a measuring transducer of vibration-type—suitable for application in a measuring system according to FIGS. 1a, 1b.

For registering the at least one measured variable, the measuring system includes: a measuring transducer MT interacting with the medium to be measured—here, insertable into the course of the process line via flanges 13, 14, and, consequently, flowed-through by the medium to be measured during operation—for transducing the at least one measured variable into at least one measurement signal dependent thereon; as well as a measuring device electronics ME electrically coupled with the measuring transducer MT, especially a measuring device electronics ME accommodated in an impact- and/or pressure resistant, electronics housing 200, for activating the measuring transducer and for evaluating the at least one measurement signal, especially an electrical, measurement signal, dependent on the at least one measured variable, namely for producing, utilizing the measurement signal, at least one measured value representing the measured variable to be registered. The measuring transducer comprises, as shown schematically in FIG. 2: at least one measuring tube 10, for example, a measuring tube of metal, which is sufficiently pressure resistant and, here, V-shaped, for carrying the medium; as well as, mechanically coupled with the at least one measuring tube, an equally pressure-resistant, transducer housing 100, consequently a transducer housing 100 having a pressure resistance of greater than 80 bar, especially greater than 100 bar, which forms a cavity 100' at least partially accommodating the measuring tube 10. For the purpose of generating the measurement signal corresponding to the measured variable to be registered, there is provided, furthermore, at least one sensor element 50—interacting with the measuring tube 10 and/or with the medium guided therein—placed within the cavity 100' formed by the transducer housing 100, and arranged directly on the measuring tube, or in the immediate vicinity of the same and reacting to changes of the at least one measured variable with a corresponding change of at least one signal parameter, for example, a signal amplitude, a signal frequency or a phase angle.

In an embodiment of the invention, the measuring device is implemented as a Coriolis, mass flow measuring device and/or as a density measuring device and accordingly the measuring transducer is of vibration-type, in the case of which the at least one measuring tube 10 is caused during operation, at least at times, to vibrate for the purpose of generating the measurement signal and in the case of which the at least one sensor element 50 serves for registering local vibrations of the measuring tube correlated with a mass flow rate and/or a density of a medium flowing through said measuring tube 100. For producing the vibrations of the at least one measuring tube 10, the measuring transducer includes, furthermore, an oscillation exciter 40 interacting with the measuring tube and, same as the sensor element, placed within the cavity 100' formed by the transducer housing.

Figure 3C:
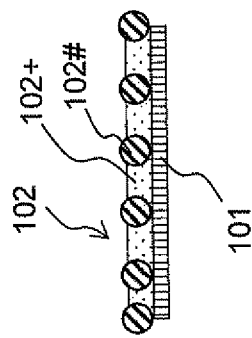
FIGS. 3a, 3b and 3c are detail views of variants of transducer housings suitable for forming a measuring transducer according to FIG. 2, consequently for forming a measuring system according to FIGS. 1a, 1b.
Figure 3B:
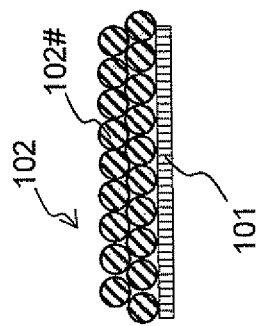
Figure 3A:
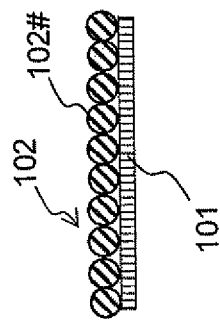

As already indicated above, the measuring system is provided especially for use in applications with media having high pressure. Particularly for achieving a correspondingly high pressure resistance, the transducer housing includes, in the case of the measuring transducer of the invention, especially: an inner shell 101, for example, one of metal, or, in given cases, of a fiber reinforced, synthetic material, namely an inner shell 101 forming the cavity accommodating the at least one measuring tube 10 as well as also the sensor element mounted thereon; as well as an outer cladding 102 formed, at least partially, by means of a yarn 102# wound multiple times around the inner shell, namely an outer cladding 102 placed outside of the cavity and surrounding the inner shell 101, for example, in such a manner, that the outer cladding 102 and the inner shell 101 of the transducer housing, as schematically presented in each case in FIGS. 2, 3a, 3b, and 3c, directly contact one another, and/or the yarn 102#, as schematically presented in FIG. 3b, is wound to lie in the form of superimposed layers on the inner shell 101 and thus is wound multiple times around the inner shell 101.

In an additional embodiment of the invention, it is, in such case, furthermore provided that the outer cladding 102 has, counteracting a static internal pressure potentially reigning within the cavity 100'—namely in the case of the springing of a leak, or bursting, of the measuring tube—, a pressure resistance, which amounts to more than 10% of a pressure resistance of the transducer housing 100 counteracting said internal pressure, consequently that the inner shell 101 has, counteracting said static internal pressure reigning within the cavity 100', a pressure resistance, which amounts to less than 90% of the pressure resistance of the transducer housing. As a result, thus, the outer cladding 102 effects, in comparison to a transducer housing formed only by means of a shell corresponding to the inner shell, a corresponding increasing of the pressure resistance coupled with comparatively only slight increase of the installed mass, respectively outer dimensions, of the measuring transducer MT.

Especially, it is, furthermore, provided that the outer cladding 102 contacts more than 50%, especially more than 80%, of the surface of the inner shell 101. The inner shell 101 of the transducer housing is, according to an additional embodiment of the invention, so embodied that it hermetically seals the cavity. Moreover, the outer cladding can be so embodied that it covers more than 50%, especially more than 80%, of the surface of the inner shell, for example, also such that large monolithic regions of the inner shell are covered opaquely by the outer cladding. The yarn 102# used for forming the outer cladding can be, for example, a filament yarn, consequently a monofilament formed by means of a single fiber, a minifilament yarn formed of two to five single fibers or a multifilament yarn having more than five single fibers. Fibers especially suitable for manufacture of the yarn 102# used here include, for example, glass fiber, carbon fiber, as well as also aramid fiber, each of which is extremely crack resistant. For additionally increasing the pressure resistance ultimately achieved for the transducer housing 100, the yarn 102# can be so wound on the inner shell 101 of the transducer housing that it is elastically strained, consequently prestressed, and/or the outer cladding 102 can be formed supplementally by means of a synthetic material 102+, for example, an epoxide resin, which, as schematically presented in FIG. 3c, serves as a matrix embedding the yarn 102#.

Figure 4:
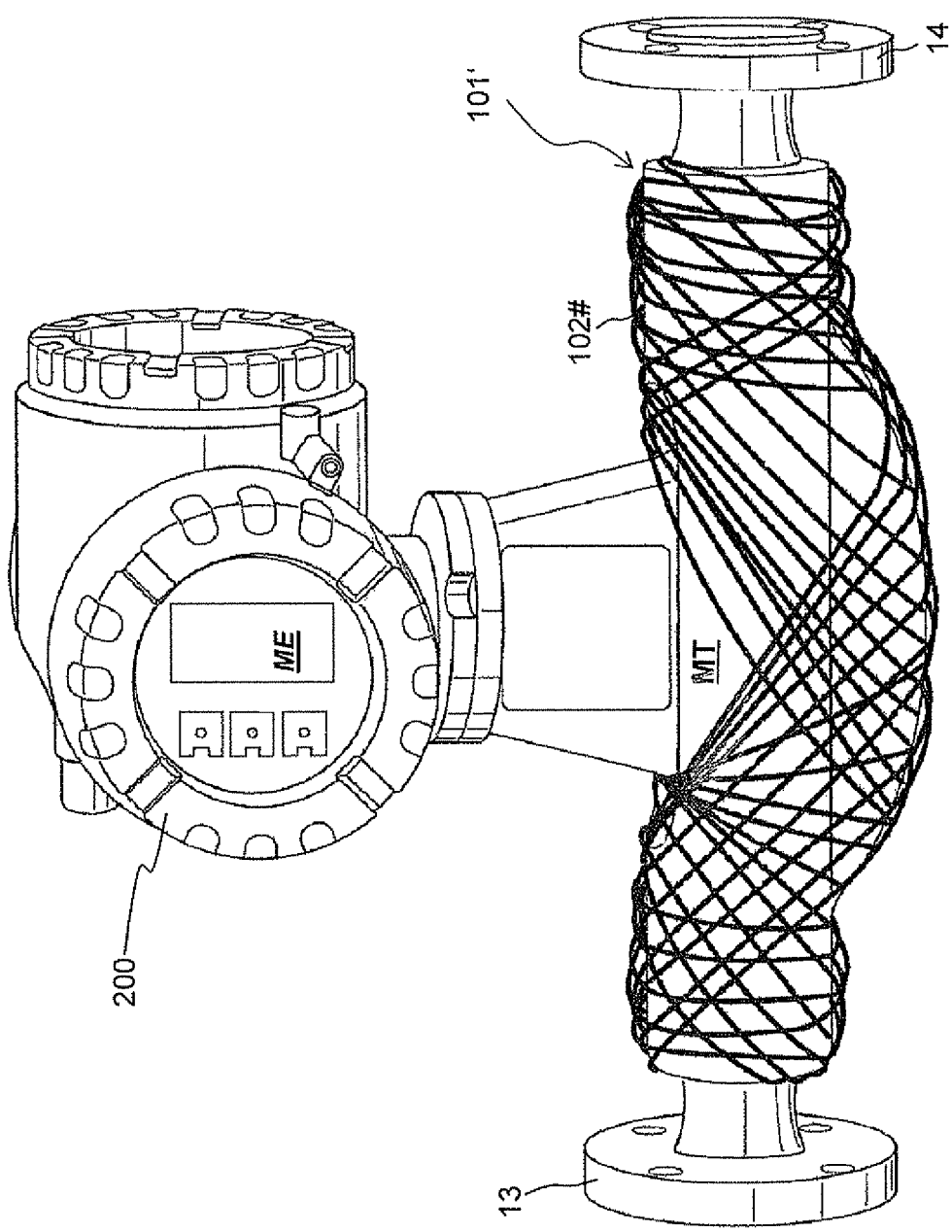
FIG. 4 is in a perspective, side view, showing another variant for a measuring system of the invention.

In an additional embodiment of the invention, it is provided—not least of all also for the purpose of simplifying the winding of the yarn 102# on the inner shell 101 and/or for the purpose of achieving an as high as possible pressure resistance also for the inner shell—that the inner shell 101 of the transducer housing, as evident from FIG. 4, has at least one, cylindrically formed region 101', especially a circularly cylindrically formed region 101', for example, thus, for instance, corresponding to a transducer housing according to the measuring transducers, respectively measuring systems, shown in the initially mentioned U.S. Pat. No. 5,796,011, U.S. Pat. No. 7,017,424, U.S. Pat. No. 7,350,421, or U.S. Pat. No. 7,392,709. Furthermore, it is, in such case, provided that the outer cladding at least partially covers this at least one, cylindrically formed region 101', consequently thus the yarn 102# is wound, as schematically presented in FIG. 4, also around said region 101' of the transducer housing.

The invention claimed is:

1. A measuring transducer, comprising:
at least one measuring tube, for carrying a flowing medium; and
a transducer housing mechanically coupled with said at least one measuring tube, wherein:
said transducer housing includes:
an inner shell, said inner shell forming a cavity accommodating said at least one measuring tube; and
said transducer housing includes an outer cladding formed at least partially by means of yarn, said outer cladding being placed outside of said cavity and surrounding said inner shell.

2. The measuring transducer as claimed in claim 1, wherein:
said yarn at least partially comprises glass fiber and/or carbon fiber and/or aramid fiber.

3. The measuring transducer as claimed in claim 1, wherein:
said yarn is a filament yarn, a minifilament yarn or a multifilament yarn.

4. The measuring transducer as claimed in claim 1, wherein:
said yarn is wound under prestress and/or multiple times around the inner shell.

5. The measuring transducer as claimed in claim 1, wherein:
said yarn is elastically strained, consequently is prestressed.

6. The measuring transducer as claimed in claim 1, wherein:
said inner shell hermetically seals said cavity.

7. The measuring transducer as claimed in claim 1, wherein:
said inner shell includes at least one cylindrically formed region.

8. The measuring transducer as claimed in claim 7, wherein:
the outer cladding at least partially covers said cylindrically formed region.

9. The measuring transducer as claimed in claim 1, wherein:
the outer cladding covers more than 50%, of the surface of said inner shell.

10. The measuring transducer as claimed in claim 1, wherein:
the outer cladding contacts more than 50%, of the surface of said inner shell.

11. The measuring transducer as claimed in claim 1, wherein:
said inner shell exhibits, counteracting a static internal pressure reigning within said cavity, a pressure resistance, which amounts to less than 90% of a pressure resistance of said transducer housing counteracting said internal pressure.

12. The measuring transducer as claimed in claim 11, wherein:
the pressure resistance of said transducer housing is greater than 80 bar.

13. The measuring transducer as claimed in claim 1, wherein:
the outer cladding and said inner shell of said transducer housing contact one another.

14. The measuring transducer as claimed in claim 1, wherein:
the outer cladding includes a matrix, which embeds the yarn and is formed by means of a synthetic material.

15. The measuring transducer as claimed in claim 1, further comprising:
at least one oscillation exciter placed within said cavity formed by said inner shell for producing vibrations of said at least one measuring tube; and
at least one sensor element placed within said cavity formed by said inner shell for registering vibrations of said at least one measuring tube and for producing a measurement signal representing said vibrations.

16. A measuring system for measuring a medium flowing in a pipeline, said measuring system comprising:
a measuring transducer as claimed in claim 1 as well as a measuring electronics electrically coupled therewith for producing at least one measured value representing a measured variable of the medium.

\* \* \* \* \*